(12) United States Patent
Wichgers et al.

(10) Patent No.: US 7,633,430 B1
(45) Date of Patent: Dec. 15, 2009

(54) TERRAIN AWARENESS SYSTEM WITH FALSE ALERT SUPPRESSION

(75) Inventors: Joel M. Wichgers, Urbana, IA (US);
Richard D. Jinkins, Rewey, WI (US);
Patrick D. McCusker, Walker, IA (US);
Richard M. Rademaker, Rijswijk (NL);
Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/901,084

(22) Filed: Sep. 14, 2007

(51) Int. Cl.
*G01S 13/93* (2006.01)
*G08B 23/00* (2006.01)
*G01S 13/00* (2006.01)
*G01S 13/95* (2006.01)

(52) U.S. Cl. ............ 342/65; 342/26 R; 342/26 B; 342/61; 342/118; 342/120; 342/121; 342/159; 342/165; 342/173; 342/175; 342/195; 701/1; 701/3; 701/4; 701/8; 701/9; 701/300; 701/301; 340/945; 340/963; 340/970

(58) Field of Classification Search ............ 342/13–20, 342/26 R–26 D, 27–32, 61–65, 159, 165, 342/173–175, 195, 118–123; 340/945, 963, 340/970; 455/226.1; 701/1, 3, 4, 8, 9, 300, 701/301
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,397,397 A | 8/1968 | Barney | |
| 3,715,718 A * | 2/1973 | Astengo | 340/970 |
| 3,739,380 A | 6/1973 | Burdic et al. | |
| 3,795,909 A * | 3/1974 | Vehrs, Jr. | 342/65 |
| 3,815,132 A | 6/1974 | Case, Jr. et al. | |
| 3,936,796 A * | 2/1976 | Bateman | 340/970 |
| 3,946,358 A * | 3/1976 | Bateman | 340/970 |
| 3,988,713 A * | 10/1976 | Bateman | 340/970 |
| 4,499,469 A * | 2/1985 | Kesterson | 342/65 |
| 4,533,915 A * | 8/1985 | Lucchi et al. | 342/26 B |
| 4,750,215 A * | 6/1988 | Biggs | 455/226.1 |
| 4,760,396 A | 7/1988 | Barney et al. | |
| 5,075,685 A * | 12/1991 | Vermilion et al. | 340/970 |
| 5,283,574 A * | 2/1994 | Grove | 340/970 |
| 5,852,417 A * | 12/1998 | Valentine et al. | 342/20 |

(Continued)

OTHER PUBLICATIONS

U.S. Appl. No. 11/901,058, filed Sep. 14, 2007, Wichgers et al.

(Continued)

*Primary Examiner*—Bernarr E Gregory
(74) *Attorney, Agent, or Firm*—Daniel M. Barbieri (57) ABSTRACT

A terrain awareness and warning system includes electronics for receiving radar returns and providing terrain and/or obstacle alerts or warnings in response to the radar returns. The electronics receives information from a database and the information is utilized to suppress false alerts or warnings.

21 Claims, 5 Drawing Sheets

U.S. PATENT DOCUMENTS

| | | | |
|---|---|---|---|
| 5,945,926 A | 8/1999 | Ammar et al. | |
| 6,043,771 A * | 3/2000 | Clark et al. | 342/20 |
| 6,137,406 A * | 10/2000 | Ono | 342/20 |
| 6,201,493 B1 * | 3/2001 | Silverman | 342/20 |
| 6,204,798 B1 * | 3/2001 | Fleming, III | 342/20 |
| 6,483,452 B1 * | 11/2002 | Iwakini | 342/20 |
| 6,593,875 B2 * | 7/2003 | Bergin et al. | 342/121 |
| 6,670,905 B1 * | 12/2003 | Orr | 342/20 |
| 6,744,401 B2 * | 6/2004 | Hager et al. | 342/195 |
| 6,771,207 B1 * | 8/2004 | Lang | 342/26 R |
| 7,183,942 B2 * | 2/2007 | Rock et al. | 342/20 |
| 2002/0135504 A1 * | 9/2002 | Singer | 342/20 |
| 2003/0102999 A1 * | 6/2003 | Bergin et al. | 342/121 |
| 2003/0210180 A1 * | 11/2003 | Hager et al. | 342/165 |
| 2003/0218562 A1 * | 11/2003 | Orr | 342/20 |
| 2007/0120728 A1 * | 5/2007 | Orr | 342/20 |

OTHER PUBLICATIONS

McGrath, John K., *Technical Standard Order*, Department of Transportation, Federal Aviation Administration, Sep. 30, 2004, 11 pages.

* cited by examiner

TERRAIN AWARENESS SYSTEM WITH FALSE ALERT SUPPRESSION

CROSS-REFERENCE TO RELATED PATENT APPLICATIONS

This application is related to pending U.S. patent application Ser. No. 11/901,058, filed on an even date herewith, and entitled "SYSTEM FOR DISTINGUISHING AMONG RADAR RETURNS," and assigned to the assignee of the present application.

BACKGROUND OF THE INVENTION

The present application relates generally to the field of terrain avoidance systems. More specifically, the application relates to a terrain avoidance system that may suppress false alerts.

Terrain awareness systems, such as Terrain Awareness Warning Systems (TAWS), typically provide flight crews with information (e.g., alerts, warnings, displays of terrain data, etc.) related to detection of potentially hazardous terrain situations that pose or may pose a threat to the continued safe flight and landing of an aircraft and provide warnings or alerts in sufficient time for the flight crew to take effective action to prevent a controlled flight into terrain (CFIT). Terrain awareness systems generally have three alerting functions including a Ground Proximity Warning System (GPWS) alerting function, a Forward Looking Terrain Avoidance (FLTA) alerting function, and a Premature Descent Alerting (PDA) function.

Terrain awareness systems have been implemented using terrain elevation databases to support the FLTA alerting function. These systems look ahead of the aircraft's current position by using a terrain elevation database to determine if there is terrain in regions that would be potentially hazardous to the aircraft.

While not required by the Federal Aviation Administration (FAA) TAWS technical standard order, alerting for obstacles (e.g., man-made structures such as towers or buildings) that pose a hazard to the aircraft is often included in TAWS packages. Current TAWS packages tend to solely use obstacle databases to support this additional obstacle alerting function.

An alternative means of compliance with the FAA TAWS forward looking terrain alerting function requirements (which are currently defined in FAA Technical Standard Order (TSO) C115b) is a Radar-based TAWS (R-TAWS). Such a system uses airborne radar sensors (e.g., similar to the radar that is used for weather and windshear detection) to detect terrain and/or obstacles that are potentially hazardous to the aircraft rather than or in addition to using a database. However, this alternative method of detection that uses radar to detect terrain and/or obstacles in regions that may be hazardous to the aircraft may have difficulty achieving an acceptably low false detection rate.

What is needed is a method for reducing the false alert rate for the detection of hazardous terrain and/or obstacles in an R-TAWS. What is also needed is an improved R-TAWS that has a reduced rate of false alerts of terrain and/or obstacles.

SUMMARY OF THE INVENTION

One exemplary embodiment relates to a terrain and/or obstacle awareness system that includes electronics for receiving radar returns and providing terrain and/or obstacle alerts or warnings in response to the radar returns. The electronics receives information from a database and the information is utilized to suppress false alerts or warnings.

Another exemplary embodiment relates to a method of suppressing an alert or warning from a terrain and/or obstacle awareness system. The method includes the steps of receiving a first radar return and processing the first radar return to determine a presence of a terrain or obstacle condition requiring an alert or warning. The method also includes the steps of retrieving information from a database and suppressing the alert or warning if the information indicates the condition is a false detection.

Another exemplary embodiment relates to a terrain and/or obstacle awareness system. The terrain awareness system includes processing means for receiving radar returns and providing terrain and/or obstacle alerts or warnings in response to the radar returns. The processing means receives information from a database and the information is utilized to determine whether the alerts or warnings should be suppressed.

DETAILED DESCRIPTION OF THE PREFERRED EMBODIMENTS

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
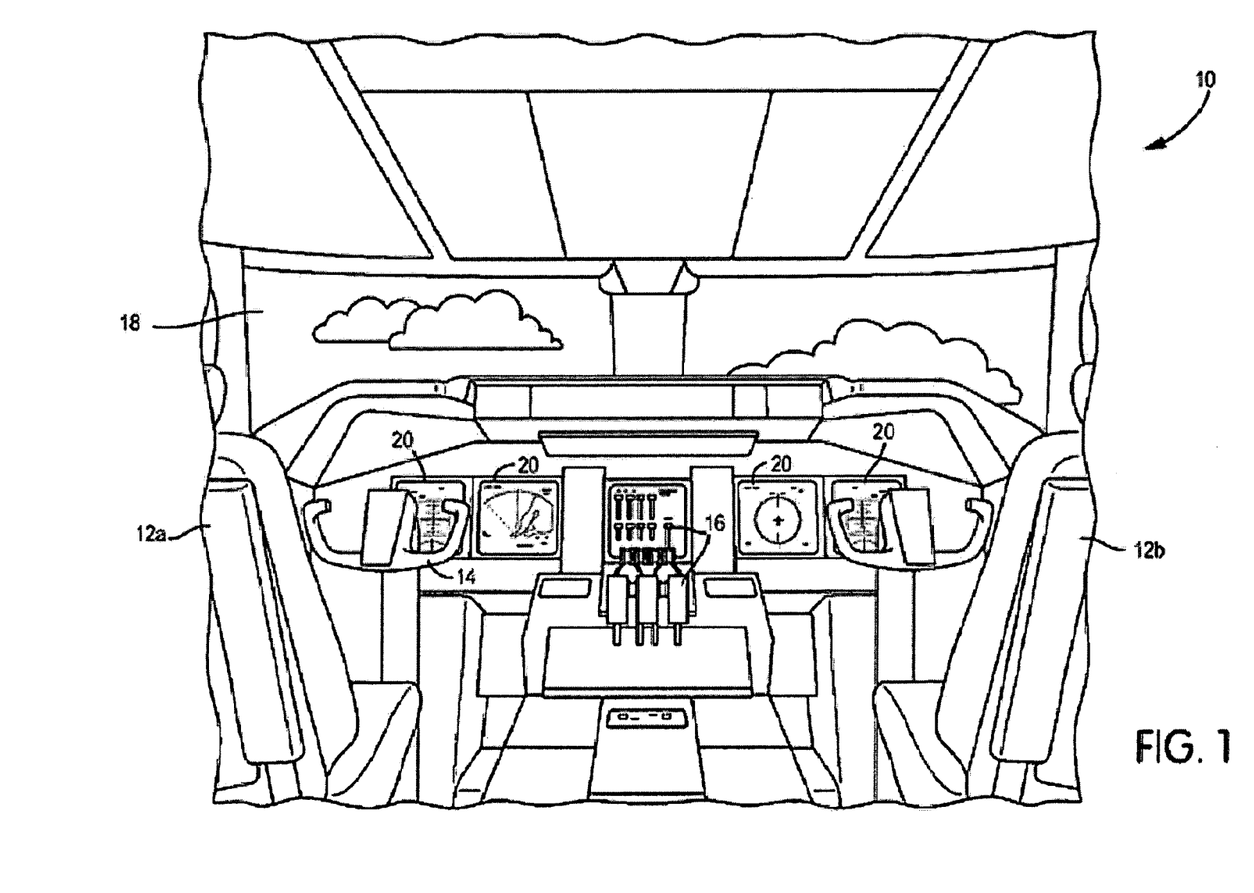
FIG. 1 is an illustration of an aircraft control center including an R-TAWS, according to one exemplary embodiment.

Referring to FIG. 1, an illustration of a cockpit or an aircraft control center 10 is shown, according to one exemplary embodiment. Aircraft control center 10 may include a pilot seat 12a, a co-pilot seat 12b, an aircraft control stick or yoke 14, a plurality of flight controls 16 and a number of flight displays 20. The pilot sitting in pilot seat 12a may utilize aircraft control stick 14 as well as other flight controls to maneuver an aircraft. The pilot may initiate aircraft maneuvers including moving the aircraft in an upwardly motion, downwardly motion, banking to the left, banking to the right or any combination thereof. The pilot can visually monitor the flight path of the aircraft through a windshield 18. However, if the pilot relies on sight through windshield 18, his or her visual range is limited.

The crew may use flight displays 20 to increase their visual range and to enhance their decision-making abilities. In an exemplary embodiment, flight displays 20 may be configured to show weather, terrain, fixed obstacles (e.g., towers and buildings), variable obstacles (e.g., other aircraft), flight characteristics (e.g., altitude or speed), or any combination thereof.

Figure 2A:
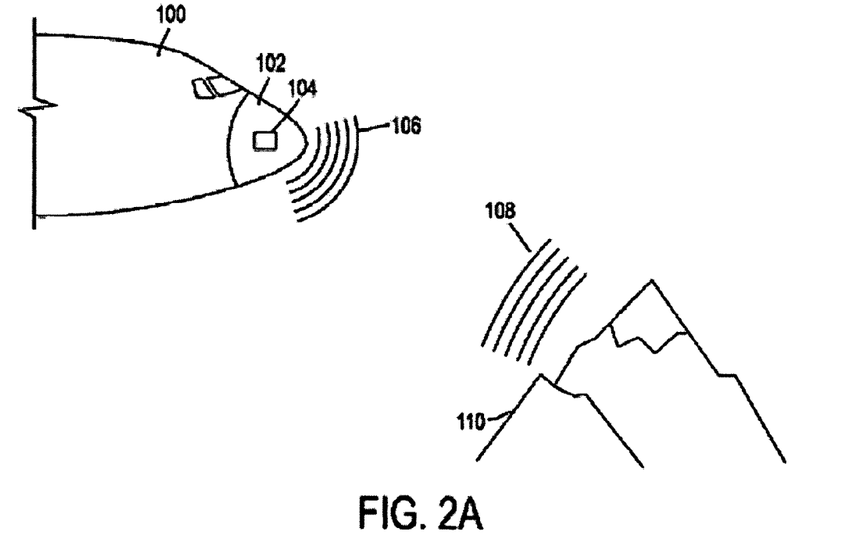
FIG. 2A is an elevation view of an aircraft cone section, which includes the aircraft control center and R-TAWS of FIG. 1 according to an exemplary embodiment.

Referring to FIG. 2A, an aircraft 100 includes an aircraft cone section 102, which includes a terrain awareness system, such as a R-TAWS 104. According to one exemplary embodiment, R-TAWS 104 utilizes a broad band directional receiver and an active radar for detection of terrain and/or obstacles, for example terrain 110. In another exemplary embodiment, terrain 110 may instead be a tower, for example a radio tower, a television tower, a bridge, a building, a cellular phone tower, another similar structure, or any combination thereof. In another exemplary embodiment, R-TAWS 104 may be configured to detect multiple obstacles or terrain features. It should be noted that the terrain and obstacle sources can be any source detectable by R-TAWS 104.

In one exemplary embodiment, R-TAWS 104 may be configured to transmit a first radio frequency wave 106 in a predetermined pattern. First radio frequency wave 106 reflects off of terrain 110 to become a second radio frequency wave 108. Second radio frequency wave 108 is detected by R-TAWS 104. In an exemplary embodiment, R-TAWS 104 includes an R-TAWS processor 44 (see FIG. 3) that determines whether second radio frequency wave 108 relates to terrain 110.

Figure 2B:
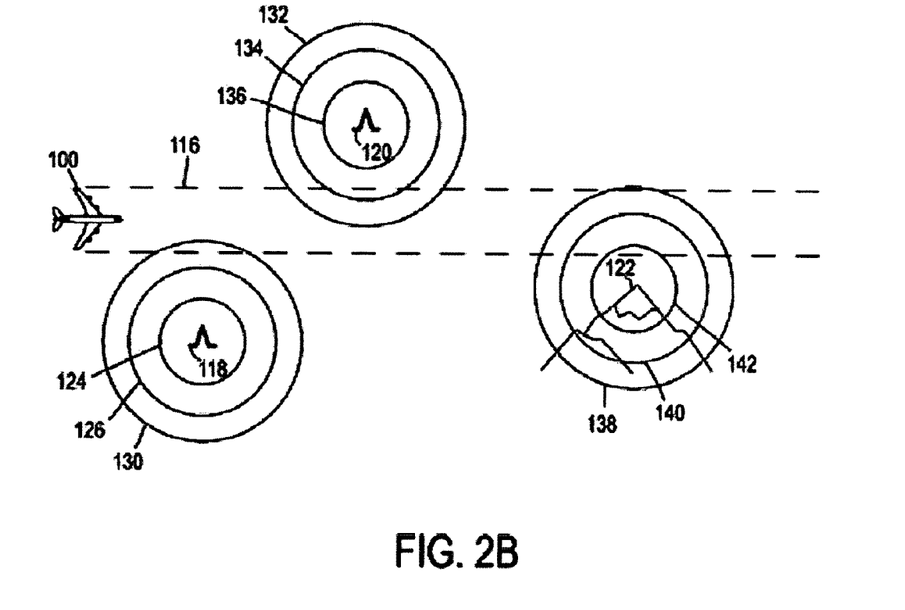
FIG. 2B is an overhead schematic view of the aircraft of FIG. 2A encountering terrain and obstacles along a flight path according to an exemplary embodiment.

In FIG. 2B, an illustration of aircraft 100 traveling on a flight path 116 that will be in proximity to a first tower 118, a second tower 120 and terrain 122 as is shown, according to one example. First tower 118 has a first warning envelope 124, a first caution envelope 126, and a first advisory envelope 130 which surround first tower 118. In this example, flight path 116 will intersect with first advisory envelope 130 and R-TAWS 104 may be configured to transmit an advisory signal and/or message to the flight crew (e.g., on display 20).

Second tower 120 has a second warning envelope 132, a second caution envelope 134, and a second advisory envelope 136 which surround second tower 120. In this example, flight path 116 will intersect with second advisory envelope 136 and second caution envelope 134. R-TAWS 104 may be configured to transmit an advisory signal and/or caution signal to the flight crew (e.g., on display 20).

Terrain 122 has a third warning envelope 138, a third caution envelope 140, and a third advisory envelope 142 which surround terrain 122. In this example, flight path 116 will intersect with third advisory envelope 142, third caution envelope 140 and third warning envelope 138. R-TAWS 104 may be configured to transmit a warning signal and/or message. In another exemplary embodiment, R-TAWS 104 may be configured to transmit an advisory signal based on the distance aircraft 100 is away from terrain 122. In this exemplary embodiment, R-TAWS 104 may be configured to transmit a caution signal as aircraft 100 travels closer to terrain 122. In this exemplary embodiment, R-TAWS 104 may be configured to transmit a warning signal as aircraft 100 continues to approach terrain 122.

It should be noted that according to various exemplary embodiments, the warning envelopes, caution envelopes and advisory envelopes may form a regular shape (e.g., circle, triangle, ellipse, square, rectangle, etc.) or any irregular shape. The shape of the warning envelope is not disclosed in a limiting fashion unless the shape is specifically recited in the claims.

Figure 3:
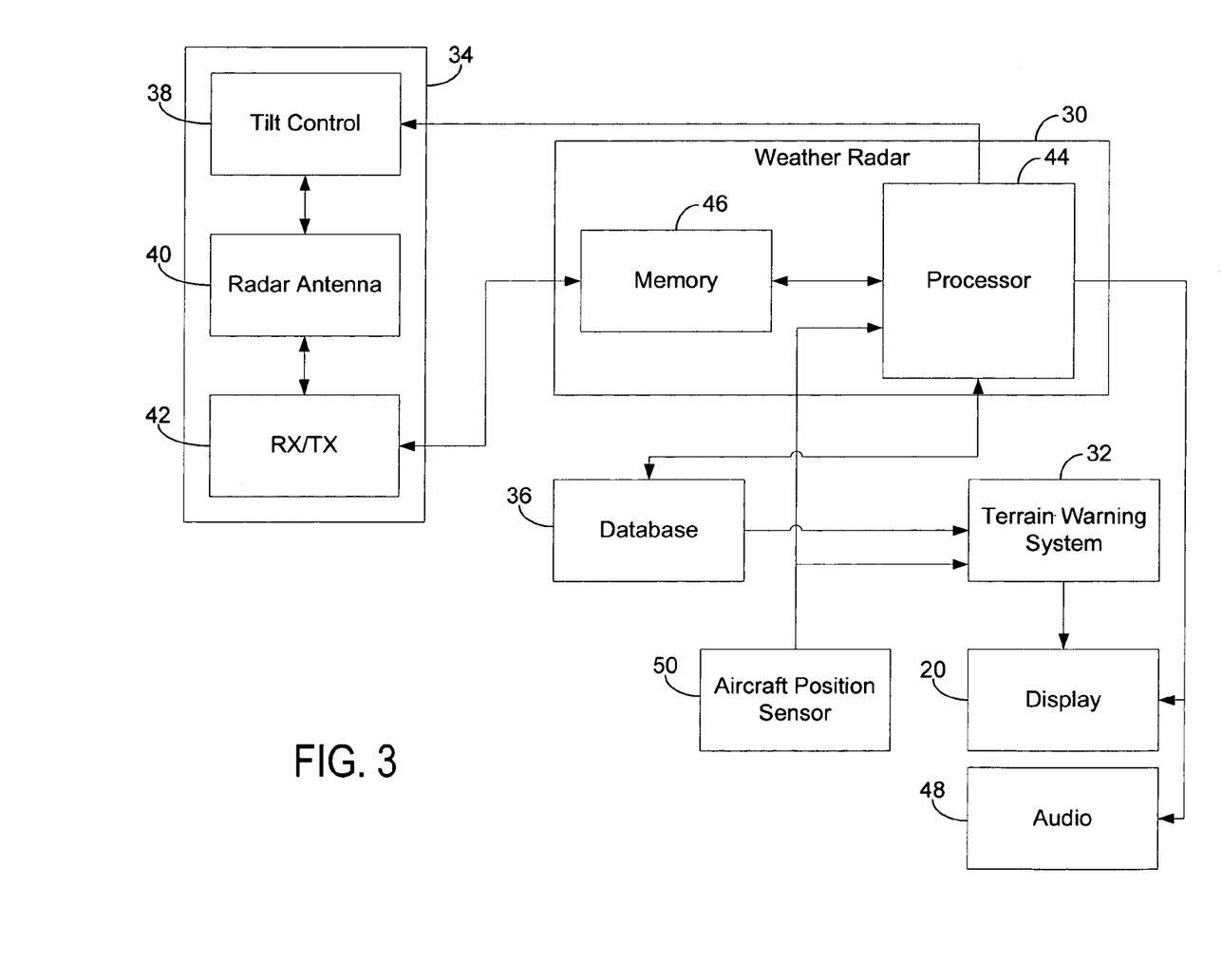
FIG. 3 is a general block diagram of the R-TAWS of FIG. 1 using a terrain database and a weather radar system in accordance with an exemplary embodiment.

Referring to FIG. 3, aircraft 100 includes a weather radar system 30, a terrain warning system 32 (e.g., R-TAWS 104), and an antenna system 34. Antenna system 34 of weather radar system 30 is capable of casting a radar beam(s) and receiving reflective energy from weather systems, terrain, and other obstacles. Weather radar system 30 preferably produces the beam(s) and receives reflectivity energy from various targets while the information is accumulated by a local database and is available for processing by terrain warning system 32. In one embodiment, the local database can be a terrain elevation database 36.

Weather radar system 30 can be similar to the system described in U.S. Pat. No. 6,388,608. Alternatively, weather radar system 30 can be a radar-based wind shear detection system or a monopulse radar system. Advantageously, system 30 is capable of providing terrain elevation estimates or data to a terrain database 36 for use with terrain warning system 32. According to one embodiment, the terrain elevation estimates are provided real time or almost real time as aircraft 100 is operated.

Aircraft 100 preferably includes an antenna system 34 including a tilt control 38, a radar antenna 40, and a receiver/transmitter circuit 42. System 100 preferably includes a processor 44 and a memory 46. System 100 is coupled to display 20 which can be a multi-function flight display, a dedicated display, or any type of visual display.

In a preferred embodiment, weather radar system 30 is configured to provide terrain elevation estimates and system 32 utilizes terrain elevation database 36 to provide terrain warnings or terrain avoidance instructions via display 20 and/or an audio system 48. Although system 30 and 32 are shown as distinct systems, they can be provided as a single system or as parts of other systems or other electronics associated with aircraft 100.

System 32 can be any type of TAWS system that uses a terrain elevation database. System 32 is preferably coupled to a terrain elevation database 36 for receiving terrain elevation estimates. System 32 can be configured to provide warnings and corrective actions to prevent controlled flight into terrain. System 32 can include basic ground proximity warning system (GPWS) alerts, forward-looking terrain avoidance (FLTA), and premature descent alerting (PDA) functions. System 32 can operate according to FAA technical standard order TSO-C115b.

Processor 44 can utilize a variety of techniques for determining or generating terrain elevation estimates for terrain elevation database 36. In one embodiment, processor 44 is configured to have system 32 provide multiple beams swept in azimuth that have different beam elevations. The multiple beams can be used to determine an angle to terrain features using the difference in return power to estimate the target angle within the beam. Using the range with both this intra-beam angle and the beam's center angle, the altitude of the terrain can be determined relative to the altitude of aircraft 100. The use of multiple beams is similar to target angle estimation by lobing between different antennas, each pointing at a different elevation in the terrain detection case. Just as amplitude can be compared between two beams so can the received signal phase to produce a classic monopulse or sequential lobing estimate of the target angle within the beam set.

In another alternative, antenna 40 can be controlled in a single azimuth sweep while the data used to support terrain height estimation is taken with either a vertical monopulse antenna or vertically orientated sequential lobed antenna. In yet another alternative, the antenna may have vertically swept beams using monopulse antennas and receivers to create terrain data or estimates. Such systems have been utilized in military terrain following and terrain alerting (TF/TA) systems. Advantageously, the use of system 30 allows an existing onboard system of aircraft 100 to provide a low-cost integration for onboard calculation of terrain elevation estimates for a terrain elevation database 36.

Processor 44 can receive altitude information from an aircraft position sensor 50 to determine the elevation of the terrain, obstacle or feature of the terrain. Sensor 50 can be a GPS system, an altimeter, radar altimeter, etc. Alternatively, processor 44 can provide a relative terrain data which is used by terrain warning system 32 to determine the sensed terrain elevation.

The terrain elevation estimates can be provided in a variety of forms. In the preferred embodiment, terrain elevation estimates are referenced to mean sea-level. Aircraft altitude is generally referenced to mean sea-level. The terrain data is preferably referenced to geographic coordinates (e.g., latitude, longitude, etc.). Images representative of the terrain data can be displayed as a grayscale or color on an X-Y plane, where colors, darkness or lightness represent altitude. The terrain data can also be provided as a relative terrain with respect to the altitude of the aircraft or flight plan.

Database 36 can be configured in variety of fashions. In one embodiment, database 36 is addressed with respect to geographic location. In another embodiment, database 36 can be addressed with respect to its relative position with respect to the aircraft.

In a preferred embodiment, weather radar system 30 is a pulse Doppler radar system. System 30 preferably includes a weather radar return processing unit (e.g., processor 44) that can calculate standard deviations of wind velocities, a mean velocity parameter, a spectral width parameter, a range parameter, a weather height parameter and reflectivity parameter to generate turbulence alerts, and to provide a display signal to display 20. System 30 is also capable of recording historical data for use in cell growth analysis. In one embodiment, system 30 detects reflectivity by measuring the power of the returned signal. Velocity is measured by detecting changes in phase angle of returned pulses. Spectral width is measured by detection variation in change of phase angle of returned pulses. Cell elevation is determined by comparing return power levels at different tilt angles or by examining data from a volumetric memory representing different altitudes. Alternatively, system 30 can be a monopulse system.

Display 20 preferably provides color graphical images corresponding to the intensity of the radar returns. The graphical images can represent weather regions, rainfall densities, turbulence regions, etc. System 32 can cause display 20 to provide visual indications of potential hazards (e.g., obstacles and terrain) including icons. In one embodiment, audio alerts are also provided on audio equipment 48.

System 30 can be a WXR-2100 MultiScan™ radar system or similar system manufactured by Rockwell Collins configured to include the features associated with terrain database 36. According to certain embodiments, system 30 can be an RDR 4000 system or similar system manufactured by Honeywell International, Inc. configured to include the features associated with terrain elevation database 36. The principles of the present invention are applicable to any aircraft weather radar system. The present invention is not limited to any type of hardware platform.

In operation, processor 44 of system 30 provides signals, either directly to receiver/transmitter circuit 42 or indirectly through memory 46, to provide radar beams at radar antenna 40. Preferably, processor 44 is configured to operate system 30 as a pulse Doppler multi scan, multi-tilt angle radar system or a volumetric radar system in which radar beams are produced at more than one tilt angle. Processor 44 receives radar returns through receiver/transmitter circuit 42.

Processor 44 can receive the radar returns (or signals/data related thereto) directly or through memory 46. Receiver/transmitter circuit 42 can be a single path or can have separate circuits for a receive path and a transmit path. Processor 44 can use radar returns to determine a reflectivity parameter, a mean velocity parameter and/or a spectral width parameter for use by system 30. Processor 44 executes software to effect terrain sensing and weather sensing operations.

Figure 4:
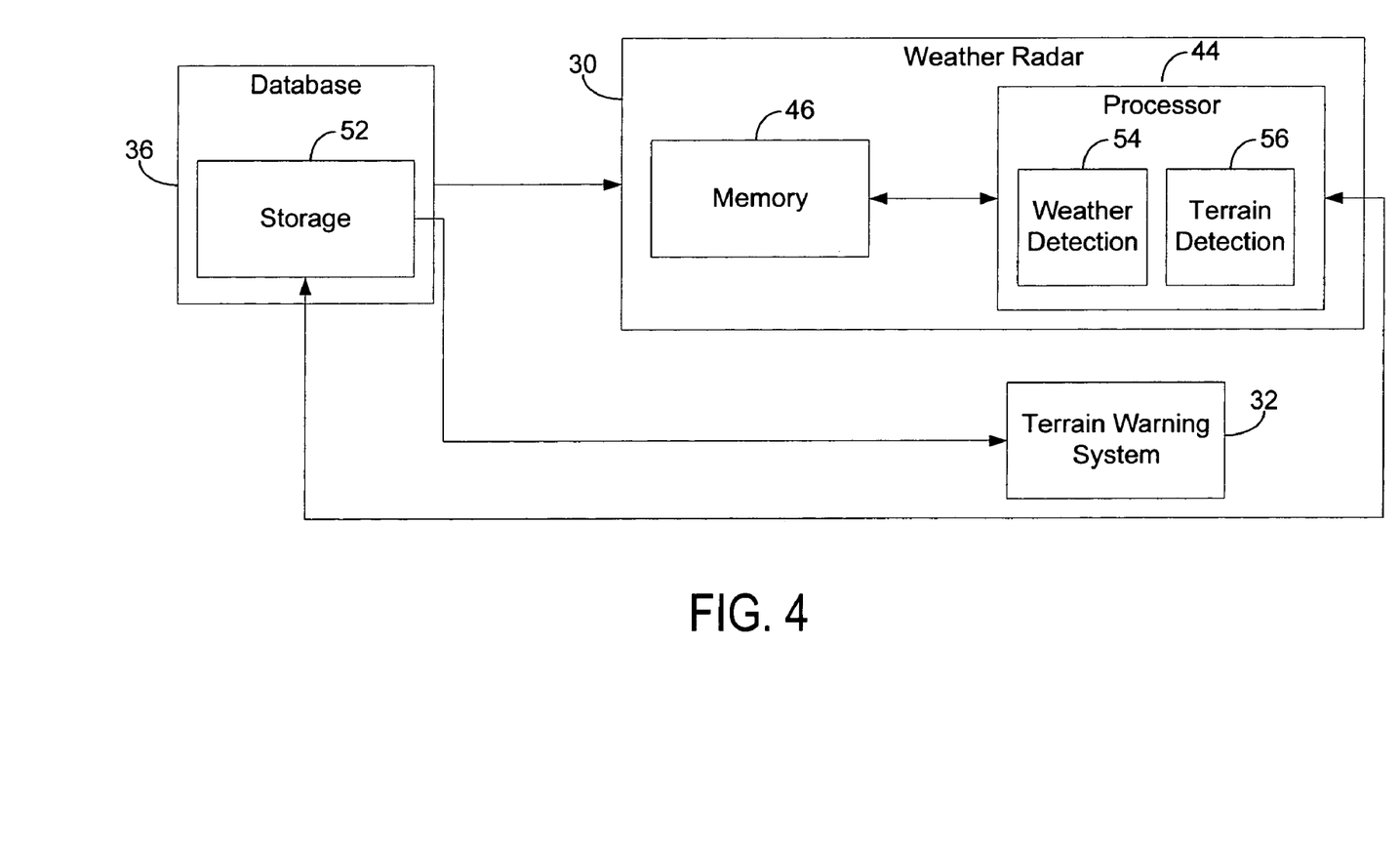
FIG. 4 is a more detailed block diagram of the R-TAWS illustrated in FIG. 3 in accordance with an exemplary embodiment.

With reference to FIG. 4, terrain database 36 receives an input from weather radar system 30. Preferably, terrain elevation estimates are provided to storage 52 of terrain elevation database 36.

Preferably, processor 44 includes a weather detection software module 54 for determining the presence of weather in response to weather radar returns and a terrain detection software module 56 for determining the presence of terrain and obstacles in response to weather radar returns. Modules 54 and 56 preferably operate on the weather radar computing platform associated with system 30. System 30 preferably alternates between weather detection and terrain detection as the flight of aircraft 100 occurs or uses antenna/transmitter pulse patterns that may be used for both the weather and terrain detection function. Dual pulse patterns advantageously reduce the total number of antenna sweeps needed to collect the different kinds of needed data (e.g., for windshear, weather, terrain, obstacle, and runway confirmation).

In one embodiment, system 30 removes data that is related to weather detected by processor 44 before it is stored in storage 52. In this embodiment, system 30 advantageously filters or subtracts out returns from the terrain elevation estimates that are associated with weather features but not with terrain features.

Such a system 30 can utilize various weather detection techniques to determine whether the feature is actual weather. For example, the estimated altitude of the feature associated with the weather radar returns can be compared to a generalized terrain database to determine if it is weather or terrain feature (e.g., a feature that is detected by the weather radar that is high above the terrain elevation for that location as determined from the database is more likely to be weather than terrain). System 30 can be configured to ignore a feature if its elevation is well above known parameters (e.g., elevation is above an error factor for the region).

Alternatively, other radar features and signatures can be utilized to determine whether the return is associated with terrain. Doppler conditions can be monitored to detect movement. Doppler mean frequencies can be estimated from radar return data. The difference between the estimated ground modeled Doppler and the radar derived target estimated Doppler frequency may be used to separate ground returns from weather returns. Alternatively, the radar data may be filtered in the frequency domain to reject weather information.

In one embodiment, storage 52 is sized to provide terrain data associated with the flight path. As aircraft 100 passes locations with stored data, storage 52 can over-write these locations with new data from locations in front of the aircraft 100. Alternatively, storage 52 is a global storage base or regional storage base associated with aircraft 100. Storage 52 is gradually built as aircraft flies from destination to destination. If aircraft 100 passes over the same terrain, the existing data in storage 52 can be rewritten or can be averaged to provide new data for the location. In this way, inaccuracies associated with a particular flight path can be reduced as the aircraft passes over the same route. In one embodiment, the averaging can be a weighted average in which older data does not contribute as much to the average as newer data.

Processor 44 may be generally configured to receive radar returns and provide terrain alerts or warnings in response to the radar returns. Processor 44 may receive information (e.g., terrain information, obstacle information, weather information, etc.) from database 36 and use the information to suppress false terrain and/or obstacle alerts or warnings. False terrain and/or obstacle alerts are typically from items that have been detected by the radar, but do not pose a hazardous condition to the aircraft. The radar may have false detections of terrain and/or obstacles caused by a number of factors including spurious antenna responses, environmental conditions between the radar and the terrain and/or obstacle environment, etc. For example, high rates of precipitation (e.g., a very high rate of rain such as greater than two inches per hour) may cause radar returns that are difficult to distinguish from terrain and/or obstacles and yield false alerts or warnings. According to various exemplary embodiments processor 44 may be embodied in software on any processing platform capable of performing and/or facilitating weather radar and/or terrain awareness warning functions, embodied in a hardware platform, for example on a hardwired weather radar or terrain awareness processor, or embodied in a combination of software and hardware that is capable of performing and/or facilitating the weather radar and/or terrain awareness functions.

Processor 44 may communicate with database 36 to verify radar returns between terrain and obstacles so that the false alert rate relating to terrain, obstacles, weather, or any combination thereof, may be reduced. While database 36 is shown to be a terrain elevation database, according to various exemplary embodiments, database 36 may be a weather database, an obstacle database, a terrain database, a hydrology database, a terrain reflectivity database, an obstacle reflectivity database, or any combination thereof. For example, if database 36 includes a weather database, a radar return may be compared with a known radar return associated with a weather pattern to determine if the radar return is correct. If database 36 includes a terrain database, a radar return may be compared with known radar returns associated with a type of terrain or with terrain known to be in a certain location to determine if the radar return is correct. If database 36 includes an obstacle database, a radar return may be compared with known radar returns associated with a type of obstacle or with that of obstacles known to be in a certain location to determine if the radar return is correct. The radar return may also be used to identify database errors or omissions.

According to one exemplary embodiment, processor 44 may suppress terrain and/or obstacle alerts or warnings continuously. According to another exemplary embodiment, processor 44 may suppress terrain and/or obstacle alerts or warnings only during certain conditions (e.g., high precipitation rates, lightning storms, etc.).

Figure 5:
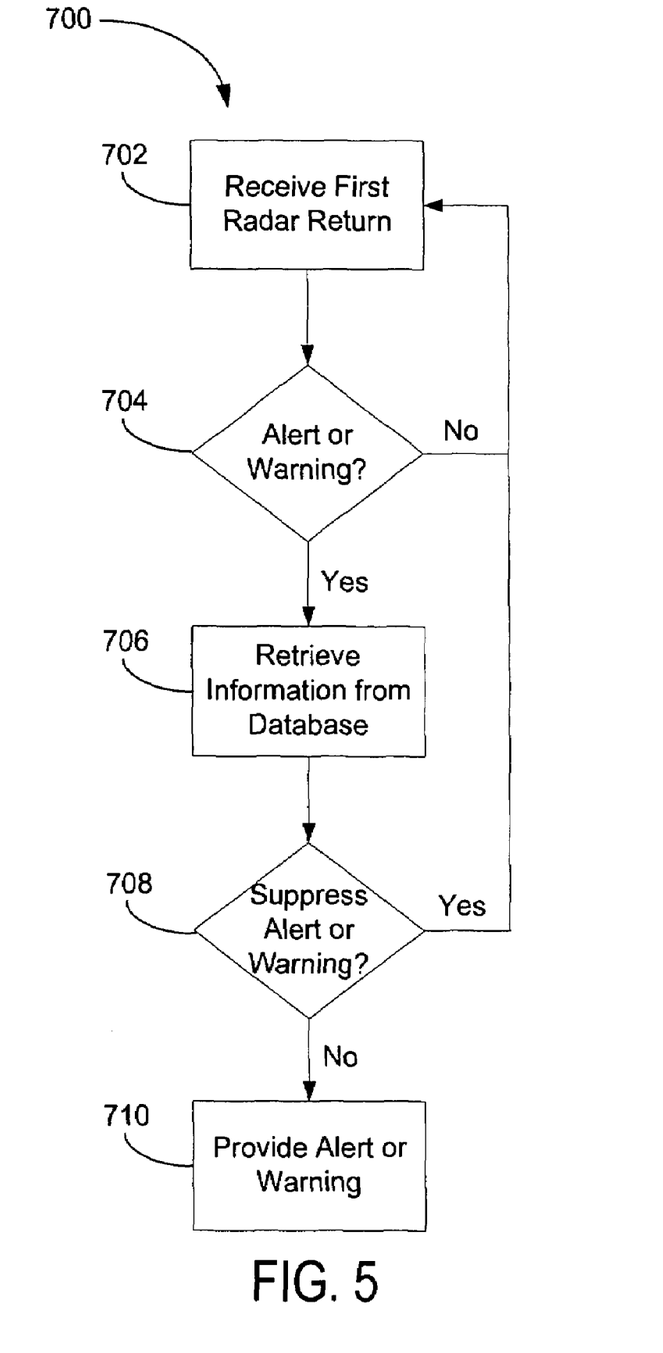
FIG. 5 is a process flow diagram of a method for reducing the rate of false alerts in the R-TAWS of FIG. 1 according to an exemplary embodiment.

Referring to FIG. 5, a method 700 may be executed by R-TAWS 104 to suppress terrain and/or object alerts or warnings. R-TAWS 104 receives a radar return of terrain and/or an obstacle (step 702).

If a processor of R-TAWS 104 (e.g., processor 44) detects a potential alert or warning regarding the scanned terrain and/or obstacle (step 704), the processor retrieves information (e.g., terrain information, obstacle information, weather information, etc.) from a database (e.g., R-TAWS database 36) (step 706). If the processor does not detect an alert or warning, the method returns to step 702 to continue scanning for potential terrain and/or obstacle hazards.

The processor uses the received information to determine whether the alert and/or warning from the radar return is a false terrain and/or obstacle alert or warning (step 708). The processor (e.g., R-TAWS processor 44) may communicate with a database (e.g., R-TAWS database 36) to verify radar returns between terrain and obstacles so that the false alert rate relating to terrain or obstacles may be reduced.

False terrain and/or obstacle alerts are typically from items that have been detected by the radar, but do not pose a hazardous condition to the aircraft. The radar may have false detections of terrain and/or obstacles caused by a number of factors including antenna side lobes, radome reflection lobes, environmental conditions between the radar and the terrain and/or obstacle environment, etc. For example, high rates of precipitation above two inches of rain per hour may cause radar returns that are difficult to distinguish from terrain and/or obstacles and that yield false alerts or warnings. In another example, the melting of icy hydrometers may produce large radar returns that are difficult to distinguish from radar returns from terrain even though the precipitation rate may be low.

According to various exemplary embodiments, the database may be a weather database, a terrain database, an obstacle database, a hydrology database, a terrain reflectivity database, an obstacle reflectivity database, or any combination thereof. For example, if the database includes a weather database, a radar return may be compared with a known radar return associated with a weather pattern to determine if the radar return is correct. If the database includes a terrain database, a radar return may be compared with known radar returns associated with a type of terrain or with terrain known to be in a certain location to determine if the radar return is correct. If the database includes an obstacle database, a radar return may be compared with known radar returns associated with a type of obstacle or with that of obstacles known to be in a certain location to determine if the radar return is correct.

According to one exemplary embodiment, method 700 may suppress terrain and/or obstacle alerts or warnings continuously. According to another exemplary embodiment, method 700 may suppress terrain and/or obstacle alerts or warnings only during certain environmental conditions (e.g., high precipitation rates, lightning storms, icing conditions, smoke, smog, atmospheric particles, atmospheric contaminants, etc.). Conditions where high reflectivity rain cells are being tracked may produce situations where a weather return may produce a false warning. Rain cells that are producing lightning can also be tracked since the convection that drives lightning may also be responsible for explosive growth in a thunderstorm. Other conditions that may produce a false alarm may include the bright-band response produced by icy hydrometers as they are melting. Hail also can produce substantial radar returns which may be confused with terrain.

Alerting conditions may be determined based upon the radar returns. However, because the radar returns may have inaccuracies or errors resulting from situations such as measurement uncertainties, measurement noise, antenna side lobes, environmental conditions, etc. These inaccuracies or errors may result in unusually large errors in determining the location of potential terrain and obstacles relative to ownship position. With a large enough error, the terrain and/or obstacles may be determined to be a hazard and hence should result in the issuance of an alert or warning. However, information available from one or more database, known or sensed environmental conditions, and/or the radar measurements can be used to determine situations when radar measurement errors are likely to occur, and when the alerts determined based upon the radar sensing should be suppressed.

One exemplary method to suppressing the alert is to confirm that the radar-detected terrain or obstacle potential threat is hazardous based upon information that is available in terrain and/or obstacle databases prior to issuing an alert. Another exemplary method to suppress the alert is to change (e.g., make more demanding) the alerting algorithm thresholds during conditions when unusually large errors are predicted to exist in the radar measurements. The alert suppression function within a terrain and/or obstacle alerting system may mitigate the false or nuisance alerts provided to the pilots or flight crew, while still allowing situations the system to alert during real alerts.

If an alert or warning exists but is not suppressed, the method may provide an alert and or warning (e.g., via display 20, an audible tone, etc.) to the flight crew (step 708). If an alert is suppressed, method 700 may return to step 702 and scan for potentially hazardous terrain and/or obstacles. If the alert or warning is suppressed, an indicator of a suppressed alert or warning can be provided to the flight crew via display 20, an audible tone, etc.

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the radar-based terrain awareness warning system as shown in the various exemplary embodiments is illustrative only. The radar could be replaced with one or more other types of sensors, like an optical sensor, FLIR, LIDAR, millimeter wave sensor, and the like. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

What is claimed is:

1. A terrain avoidance system, comprising:
   electronics for receiving radar returns and providing terrain alerts or warnings in response to the radar returns; and
   a database configured to store at least one of terrain information and weather information,
   wherein the electronics receive the at least one of terrain information and weather information from the database and utilize the at least one of terrain information and weather information to suppress at least one of the terrain alerts and warnings.

2. The system of claim 1, wherein the electronics use the at least one of terrain information and weather information to suppress at least one of the terrain alerts and warnings due to spurious antenna responses or an environmental condition.

3. The system of claim 2, wherein the spurious antenna responses are due to side lobes or reflection lobes.

4. The system of claim 2, wherein the environmental condition is a radar reflectivity due to at least one of a precipitation rate higher than two inches per hour, hail, and a brightband.

5. The system of claim 1, wherein the electronics suppress at least one of the terrain alerts and warnings continuously.

6. The system of claim 1, wherein the electronics suppress the at least one of the terrain alerts and warnings associated with certain portions of radar scans.

7. The system of claim 6, wherein the certain portions are associated with known spurious antenna pattern responses.

8. The system of claim 1, wherein the database is a terrain, obstacle, or a combined terrain and obstacle database.

9. The system of claim 1, wherein the electronics and the database are for mounting in an aircraft and wherein the electronics receive the radar returns from an aircraft weather radar system.

10. A method of suppressing an alert or warning from a terrain awareness system, the method comprising:
    receiving a first radar return;
    processing the first radar return to determine a presence of a terrain or obstacle requiring an alert or warning;
    retrieving information comprising at least one of terrain information from a terrain database and weather information from a non-weather radar source; and
    suppressing the alert or warning if the information indicates that the determined presence of the terrain or obstacle was due to a false detection.

11. The method of claim 10, wherein the information comprises terrain information from the terrain database.

12. The method of claim 11, wherein the information comprises weather information from the non-weather radar source.

13. The method of claim 10, wherein the false detection is caused by spurious antenna responses or weather.

14. The method of claim 10, further comprising:
    providing an indication of the suppression of the alert or warning to an aircraft display.

15. The method of claim 10, wherein the receiving and processing steps are repeated until the presence of the terrain or obstacle requiring an alert or warning is detected.

16. The method of claim 10, wherein the first radar return is a weather radar return.

17. A terrain avoidance system, comprising:
    processing means for receiving radar returns and for providing terrain alerts or warnings in response to the radar returns; and
    data storage means for storing at least one of terrain information and weather information,
    wherein the processing means receives the at least one of terrain information and weather information from the data storage means and utilizes the at least one of terrain information and weather information to determine whether the alerts or warnings should be suppressed; and
    wherein the processing means suppresses the terrain alerts or warnings when the processing means determines that the alerts or warnings should be suppressed.

18. The system of claim 17, wherein the terrain alerts or warnings comprise an obstacle alert or warning.

19. The system of claim 17, wherein the processing means determines velocity information from the radar returns and utilizes the velocity information to determine whether the alerts or warnings should be suppressed.

20. The system of claim 17, wherein the at least one of terrain information and weather information comprises known radar returns for a location or an obstacle and the known radar returns are compared to the received radar returns to determine whether the alerts or warnings should be suppressed.

21. The system of claim 17, wherein the processing means and data storage means are for mounting in an aircraft and wherein the processing means receives the radar returns from an aircraft weather radar system.

* * * * *